United States Patent

[11] 3,597,749

| | | | |
|---|---|---|---|
| [72] | Inventors | Saburo Uemura<br>Kanagawa-ken;<br>Kiyoshi Himuro, Tokyo, both of, Japan | |
| [21] | Appl. No. | 792,053 | |
| [22] | Filed | Jan. 17, 1969 | |
| [45] | Patented | Aug. 3, 1971 | |
| [73] | Assignee | Sony Corporation<br>Tokyo, Japan | |
| [32] | Priority | Jan. 29, 1968 | |
| [33] | | Japan | |
| [31] | | 43/5275 | |

[54] MAGNETIC HEADS UTILIZED AS A DISPLACEMENT MEASURING INSTRUMENT
10 Claims, 9 Drawing Figs.

[52] U.S. Cl. .................................................... 340/174.1 H,
324/71 R
[51] Int. Cl. ........................................................ G11b 5/46
[50] Field of Search............................................. 340/174.1
B, 174.1 G, 174.1 H, 207; 179/100.2 B, 100.2 S;
33/125 C; 324/34 PS, 71

[56] References Cited
UNITED STATES PATENTS

| 3,327,299 | 6/1967 | Johnson | 340/174.1 |
|---|---|---|---|
| 3,368,211 | 2/1968 | Taris | 340/174.1 |
| 3,387,295 | 6/1968 | Moss | 340/174.1 |
| 3,402,350 | 9/1968 | Shellabarger | 340/174.1 |
| 3,412,385 | 11/1968 | Wang et al. | 340/174.1 |
| 3,414,816 | 12/1968 | Tobey et al. | 340/174.1 |
| 3,439,354 | 4/1969 | Behr et al. | 340/174.1 |
| 3,440,630 | 4/1969 | Niquette | 340/174.1 |

*Primary Examiner*—Bernard Konick
*Assistant Examiner*—Vincent P. Canney
*Attorney*—Hill, Sherman, Meroni, Gross and Simpson ABSTRACT: An apparatus for the magnetic recording of gradient information wherein magnetic indicia are recorded on a magnetic medium which is detected by a pair of magnetic pickup heads. Since the spacing between the magnetic indicia is fixed it is possible to accurately measure distance by counting the number of magnetic indicia which move past the heads. Since there are two heads, the direction of movement of the information may be detected also. In the present invention, the two heads are indexed by supplying a variable phase shift mean in either of two channels and the indexing is accomplished by the phase shifters and the heads do not have to be mechanically moved relative to each other for proper indexing.

PATENTED AUG 3 1971

3,597,749

INVENTOR.

SABURO UEMURA, KIYOSHI HIMURO

BY _____ ATTORNEYS

MAGNETIC HEADS UTILIZED AS A DISPLACEMENT MEASURING INSTRUMENT

CROSS REFERENCE TO RELATED APPLICATIONS

The application filed May 27, 1968, Ser. No. 732,248, entitled "Magnetic Recording Method and Device," assigned to the assignee of the present invention, discloses an apparatus for magnetic recording gradient information wherein a pair of magnetic heads are indexed by mechanically varying the distance between the two heads. U.S. Pat. No. 3,308,449 which issued on Mar. 7, 1967 to Saburo Uemura, entitled "MultiGap Magnetic Head" and assigned to the assignee of the present invention discloses a multigap magnetic head particularly adapted for reading a magnetic scale to measure length as, for example, in machine tools.

BACKGROUND OF THE INVENTION

1. Field of the Invention

This invention relates in general to measuring means and in particular to a means for measuring distance along the magnetic scale.

2. Description of the Prior Art

In modern production machinery as, for example, machine tools, it is necessary to have precise scales for accurately measuring and producing large parts. Such machines are large and bulky and require the use of long and precise scales. Such long and precise scales are difficult to manufacture, to transport and to mount. In order to avoid these difficulties it has been common in the prior art to utilize a plurality of short precise scales joined together on a large sized machine tool but this conventional method gives rise to errors in that the joints between the short scales will normally be inaccurate.

SUMMARY OF THE INVENTION

This invention relates to a displacement measuring instrument and particularly to a displacing measuring instrument in which the reference position for measurement may be shifted as desired.

In the prior art it has been proposed to measure length, angle or the like by the use of magnetic heads and a magnetic scale which has reference divisions, commonly called magnetic gratings, which are formed by recording rectangular or sinusoidal signals of a certain wavelength on a magnetic medium. The present invention relates to a readout device of such magnetic gratings which is adapted so that its indication can be set at zero without regard to the position of the magnetic heads relative to the magnetic gratings. The invention is of particular utility when employed in a displacement measuring instrument using a magnetic scale such as disclosed in U.S. Pat. application Ser. No. 732,248, filed May 27, 1968, assigned to the assignee of the present invention, and with a multigap head such as set forth in U.S. Pat. No. 3,308,449, assigned to the assignee of the present invention.

One object of the invention is to provide an instrument in which displacement can be electrically measured with high precision by the employment of a magnetic scale having magnetic ratings and magnetic heads.

Another object of the invention is to provide a displacement measuring instrument which employs a magnetic scale and magnetic heads and which can be adjusted so that the readout will be zero without regard to the position of the magnetic heads relative to the magnetic scale.

Other and further objects, features and advantages of the present invention will become apparent to those skilled in the art from the following detailed disclosure thereof and the drawings attached hereto and made a part hereof.

DESCRIPTION OF THE PREFERRED EMBODIMENTS

Figure 1:
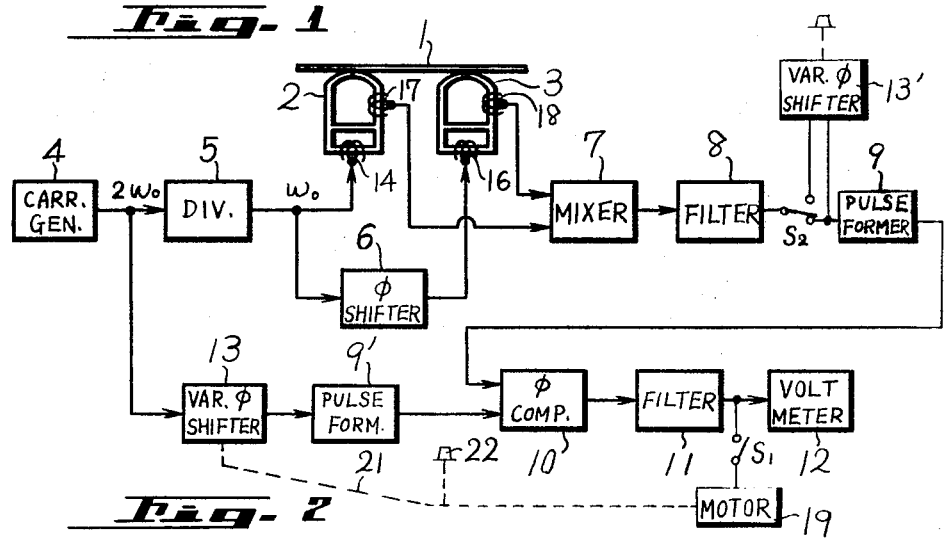
FIG. 1 is a block diagram showing one example of a displacement measuring instrument according to this invention.
Figure 2:
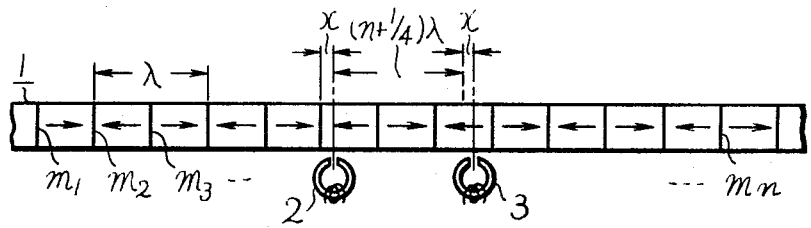
FIG. 2 is a schematic diagram for explaining the relationship between a magnetic scale and a pair of readout heads.

FIG. 1 illustrates a pair of magnetic heads 2 and 3 which may be of the modulation type and which are mounted along a magnetic scale 1. The heads 2 and 3 are spaced apart a distance of approximately $(n+1/4)\lambda$, with $n$ being a positive integer including zero and $\lambda$ being one wavelength of the magnetic gratings on the scale 1. A carrier generator 4 produces an output signal with an angular frequency of $2\omega_0$ which is supplied to a divider 5 that divides the input signal by 2. The output of the divider 5 comprises an angular signal of $\omega_0$ which is supplied to the input winding 14 of the head 2 and to a phase shifter 6 which supplies an output to the input winding 16 of the head 3.

If the magnetic flux induced in the magnetic heads 2 and 3 from the magnetic gratings $m_1, m_2, m_3, \ldots m_n$ of the magnetic scale 1 vary in a sinusoidal manner relative to the positions $x$ of the magnetic heads on the magnetic gratings, the two magnetic heads will produce the following outputs:

$$e_1 = K_1 \sin(2\pi x/\lambda)\cos\omega_0 t \quad (1)$$
$$e_2 = K_2 \cos(2\pi x/\lambda)\sin\omega_0 t \quad (2)$$

These signals are picked up by the output windings 17 and 18, respectively, from the heads 2 and 3 and are supplied to a mixer 7 which produces an output signal $e_0$.

$$e_0 = e_1 + e_2 = K\sin(\omega_0 t + (2\pi x/\lambda)) \quad (3)$$

where $K_1 = K_2 = K$. This equality is reasonable if the heads 2 and 3 are similar with the same number of windings 14, 16, 17 and 18. The composite signal $e_0$ is a voltage whose amplitude is constant and whose phase varies in proportion to the relative position of the magnetic heads 2 and 3 and the magnetic scale 1. That is, the positions $x$ of the magnetic heads within one wavelength $\lambda$ of the magnetic gratings $m_1, m_2, m_3, \ldots m_n$. Thus, measurement of the difference in phase between a reference carrier signal $P_1$ and the composite signal $e_0$ allows detection of the positions $x$ within one wavelength of the magnetic gratings.

To measure this difference in phase the output signal of the mixer 7 is fed through a filter 8 and a switch $S_2$ to a pulse former 9. The output pulse train from pulse former 9 is applied to one input of a phase comparator circuit 10 which might, for example, be a flip-flop circuit. A second input to the flip-flop circuit 10 is supplied from the carrier generator 4 through a variable phase shifter 13 and a pulse former 9'.

The outputs of the flip-flop circuit 10 is fed through a filter 11 to an indicator 12 which might, for example, be a voltmeter which can indicate the relative position $x$ between the magnetic heads 2 and 3 and the magnetic gratings.

Thus, with the use of the magnetic scale and multigap heads, the number of output pulses derived from the multigap heads by the displacement of their relative positions by a counter and at the same time a voltage will be produced which corresponds to the positions $x$ which is the amount of their displacement.

If desired, a variable phase shifter 13' which has its output connected to the pulse former 9 and which has an input terminal that may be connected to switch $S_2$ may be used rather than the variable phase shifter 13. In other words, the variable phase shifter 13 or 13' may be mounted in either or both of the channels of the measuring apparatus. The phase shifter 13 has an input shaft 21 which has a control knob 22 for adjusting the phase shift. Adjusting shaft 21, the value indicated by the indicator 12, may be set to zero irrespective of the positions of the magnetic heads relative to the magnetic gratings. The variable phase shifter 13 allows the phase of the carrier signal frequency applied to the flip-flop circuit 10 to be adjusted from zero to $2\pi$.

The arrangement illustrated in FIG. 1 allows the value indicated by the indicator 12 to be set to zero irrespective of the positions of the magnetic heads 2 and 3 relative to the magnetic gratings.

Figure 3:
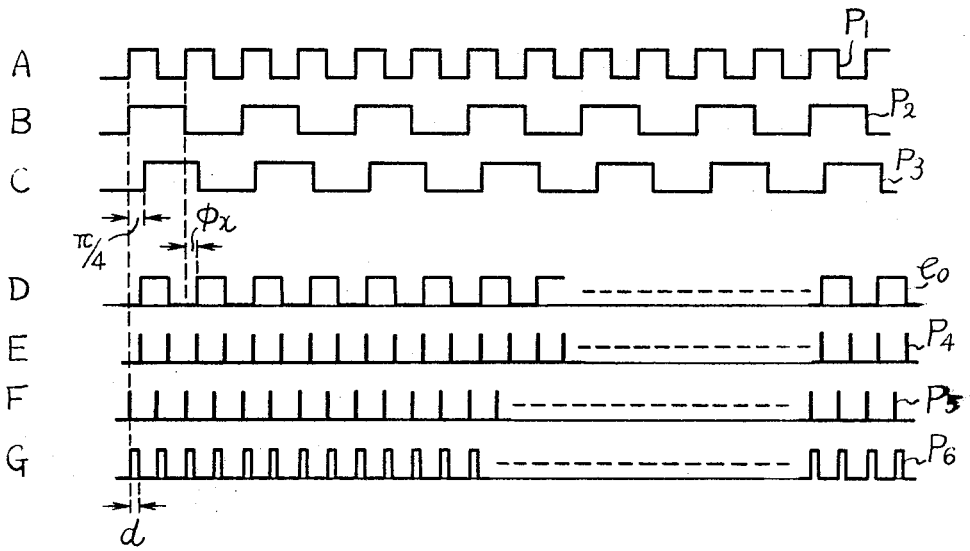
FIGS. 3A through G illustrate various waveforms appearing in the system of the invention.

As illustrated in FIG. 3 the signal $P_1$ from the carrier generator 4 is reduced to signals of half frequency by the divider 5. FIGS. 3B and 3C, respectively, illustrate the waveforms $P_2$ and $P_3$ which are applied respectively to the input windings 14 and 16 of the heads 2 and 3. It is to be noted that the signal $P_3$ which is applied to the head 3 has been delayed in phase by $\pi/4$ from the signal $P_2$ applied to the magnetic head 2.

The composite signal $e_0$ of the magnetic heads 2 and 3 has a frequency twice that of the signals $P_2$ and $P_3$, that is, a carrier frequency of $e_0$ illustrated in FIG. 3D. The signal $e_0$ will have a phase difference $\Phi_r$ relative to the reference carrier $P_1$ signal illustrated in FIG. 3A. The phase difference $\Phi_r$ is proportional to the distance $x$ from the magnetic gratings to the standstill position of the magnetic heads and when the distance $x$ varies within one wavelength $\lambda$ of the magnetic gratings the phase $\Phi_r$ varies from 0 to $2\pi$. The composite signal $e_0$ is applied as a composite pulse signal $P_4$, see FIG. 3E, as one input to the flip-flop phase comparator signal 10, and it is to be noted that the pulse former 9 forms pulses aligned with the leading and trailing edges of the pulse train $e_0$.

The second input to the flip-flop circuit 10 comprises the wave shape $P_1$ which has been passed through the pulse former 9' to produce the pulse train $P_5$ illustrated in FIG. 3F. When the phase shift of the variable phase shifter 13 is zero the signal $P_6$ out of the flip-flop circuit 10 (see FIG. 3G) has a pulse width $d$ which is proportional to the phase difference $\Phi_r$ between the composite pulse signal $P_4$ and the reference pulse signal $P_5$ and the indicator 12 will indicate an output proportional to the width $d$.

The present invention allows the phase of the reference pulse signal $P_5$ to be adjusted by the variable phase shifter 13 so that the indicator 12 will read zero. This is accomplished by adjusting the phase shift of the pulse train $P_5$ until it is coincident with that of the pulse train $P_4$, for example, by delaying the phase of the signal $P_5$ by $\Phi_r$ from the signal $P_4$. The position of the magnetic heads at this time can be considered the zero point and the zero point can be readily established even if the magnetic heads are not always in agreement with the magnetic gratings.

The variable phase shifter 13 may be adjusted by the knob 22 or alternatively the motor 19, which may be connected by switch $S_1$ to the output of filter 11, may be utilized to adjust the phase shifter 13 until the output signal of the filter 11 has a width of zero.

It is seen that this invention is of particular utility where employed in an endless magnetic scale, that is, an apparatus wherein a magnetic scale is mounted on the marginal edge of a disk to detect the rotational angle or number of revolutions of the disk. However, it is also useful in linear magnetic scales.

Alternatively the variable phase shifter 13' may be connected to the output of the filter 8 by moving switch $S_2$ from the input of the pulse former 9 to the input of the variable phase shifter 13'. The output of the variable phase shifter 13' is supplied to the pulse former 9 and the shaft 21' and knob 22' allows the output signal of the filter 8 to be varied in phase.

It will be understood that modifications and variations may be effected without departing from the spirit and scope of the novel concepts of the present invention.

We claim as our invention:

1. A displacement measuring instrument comprising a carrier signal generator, a magnetic scale having formed thereon magnetic gratings of fixed wavelength, two magnetic heads disposed in reading relationship with the magnetic scale and spaced apart from each other at a distance of $(n+1/4)$ times the recorded wavelength of the magnetic gratings, ($n$ being 0, 1, 2, 3,...), a phase shifter connected between one of the magnetic heads and the carrier signal generator, mixer means for combining the reproduced signals of the two magnetic heads to provide a composite signal, a phase comparator for comparing the composite signal of the mixer means with the carrier signal, and a variable phase shifter located in either of the paths between the phase comparator and the mixer means and between the phase comparator and the carrier signal generator.

2. A displacement measuring instrument comprising a magnetic scale with magnetic gratings of fixed wavelength formed thereon, a pair of magnetic heads mounted in reading relationship with said scale and spaced apart a distance of $(n+1/4)$ times the recorded wavelength of the magnetic gratings ($n$ being an integer including zero from zero to infinity), a generator supplying a signal to the first magnetic head, a $\pi/4$ phase shifter receiving a signal from said generator and supplying a signal to the second magnetic head, combining means connected to the outputs of said magnetic heads, phase comparing means connected to the output of the combining means and to the output of the generator, and variable phase shifting means connected to one of the inputs to said phase comparing means to adjust the phase of one of said input signals.

3. A displacement measuring instrument according to claim 2 comprising a frequency divider connected between the generator and the pair of magnetic heads.

4. A displacement measuring instrument according to claim 3 wherein said combining means comprises a mixer, a filter connected to the output of the mixer, and a pulse former connected to the output of the filter.

5. A displacement measuring instrument according to claim 4 comprising a second pulse former connected between the generator and the phase comparing means.

6. A displacement measuring instrument according to claim 5 wherein said variable phase shifting means is connected between said generator and said second pulse former.

7. A displacement measuring instrument according to claim 5 comprising a second filter connected to the output of the phase comparing means, and an indicator connected to the output of the second filter.

8. A displacement measuring instrument according to claim 5 wherein said variable phase shifting means is connected between said filter and said pulse former.

9. A displacement measuring instrument according to claim 8 comprising a motor means with its output shaft connected to said variable phase shifting means, and switch means for connecting the output of the phase comparing means to said motor means.

10. The method of measuring displacement with a pair of magnetic heads and a magnetic scale having formed thereon magnetic gratings comprising applying a signal to said magnetic heads, detecting and combining signals from said magnetic heads, comparing the combined signal from said magnetic heads with the signal applied to the magnetic heads, including phase shifting one of the signals to be compared.